(12) United States Patent
Kawano et al.

(10) Patent No.: US 7,307,768 B2
(45) Date of Patent: Dec. 11, 2007

(54) HOLOGRAM RECORDING METHOD AND HOLOGRAM RECORDING APPARATUS

(75) Inventors: Katsunori Kawano, Ashigarakami-gun (JP); Jiro Minabe, Ashigarakami-gun (JP); Shin Yasuda, Ashigarakami-gun (JP); Tatsuya Maruyama, Minato-ku (JP); Norie Matsui, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 659 days.

(21) Appl. No.: 10/782,903

(22) Filed: Feb. 23, 2004

(65) Prior Publication Data
US 2005/0012971 A1    Jan. 20, 2005

(30) Foreign Application Priority Data
Jul. 15, 2003  (JP)  ............... 2003-197411

(51) Int. Cl.
  *G03H 1/26*  (2006.01)
  *G03H 1/16*  (2006.01)
(52) U.S. Cl. .................. 359/22; 359/29; 359/900
(58) Field of Classification Search .......... 359/1, 359/22, 24, 25, 29, 35, 900; 369/103, 112.1, 369/112.15
See application file for complete search history.

(56) References Cited

U.S. PATENT DOCUMENTS 5,627,664 A * 5/1997 Trisnadi ..................... 359/11
5,719,691 A   2/1998 Curtis et al.
6,697,180 B1 * 2/2004 Wilson et al. .............. 359/11

FOREIGN PATENT DOCUMENTS

| JP | A 2000-66565 | 3/2000 |
|---|---|---|
| JP | 2000-284672 | 10/2000 |
| JP | A 2001-60394 | 3/2001 |
| JP | A 2002-40908 | 2/2002 |
| JP | 2002-174731 | 6/2002 |

OTHER PUBLICATIONS

Psaltis et al., "Holographic Storage using Shift Multiplexing," Optic Letters, vol. 20, No. 7, Apr. 1, 1995, pp. 782-784.
"7.2 Coherent Optical System Conducting Fourier Transform," Holography, Chapter 7, The Institute of Electronics, Information and communication Engineers, pp. 96-110 w/ translation.
Japanese Office Action and English translation of Japanese Office Action, Dec. 26, 2006.

* cited by examiner

*Primary Examiner*—Alessandro Amari
(74) *Attorney, Agent, or Firm*—Oliff & Berridge, PLC

(57) ABSTRACT

A hologram is recorded by irradiating, with a reference light beam, a region corresponding to an intensity distribution of a signal light beam on an optical recording medium. For example, the reference light beam having the intensity distribution which substantially coincides with the intensity distribution of the signal light beam is generated, and only the region which substantially coincides with the region irradiated by the signal light beam (i.e., the signal light beam defocused region) is irradiated with the reference light beam. This enables only the necessary region to be exposed and the regions which need not be exposed not to be exposed. Accordingly, the hologram can be recorded without losing information of the signal light beam and thus high-density recording can be realized.

13 Claims, 10 Drawing Sheets

FIG.5
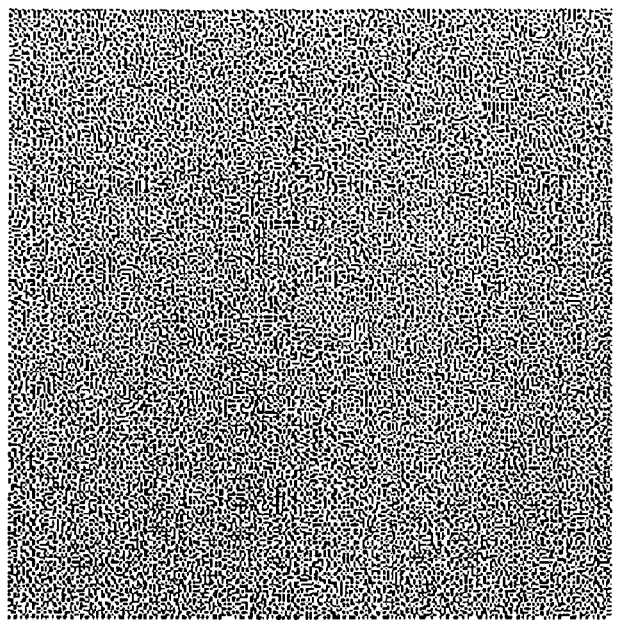
 DATA [0]
BRIGHT/DARK
 DATA [1]
DARK/BRIGHT
FIG.6
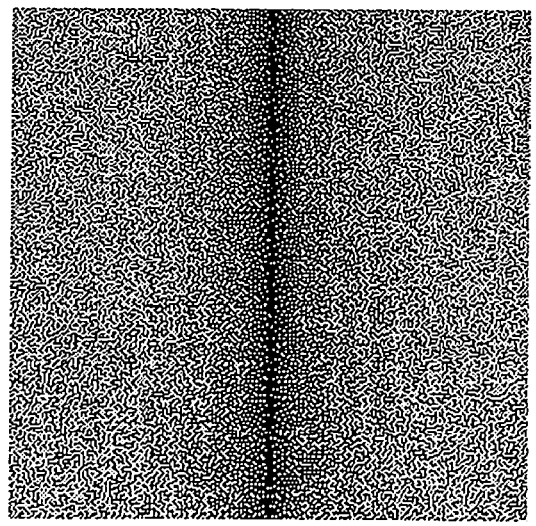

HOLOGRAM RECORDING METHOD AND HOLOGRAM RECORDING APPARATUS

CROSS-REFERENCE TO RELATED APPLICATION

This application claims priority under 35 USC 119 from Japanese Patent Application No. 2003-197411, the disclosures of which are incorporated by reference herein.

BACKGROUND OF THE INVENTION

1. Field of the Invention

The present invention relates to a hologram recording method and a hologram recording apparatus, particularly to the hologram recording method and the hologram recording apparatus in which hologram recording is performed with high density.

2. Description of the Related Art

Holographic memory receives attention as a computer memory of the next generation. The holographic memory has both large capacity derived from a three-dimensional recording region and high speed derived from a two-dimensional batch recording and reproducing method.

In the holographic memory, a plurality of data pages can be recorded by multiplexing the data pages in the same volume, and the data can be read out in each page. The digital data can be recorded and reproduced in such a manner that not an analog image but binary digital data "0,1" is digitized in the form of "bright, dark" and recorded and reproduced in the form of the hologram.

In recent years, various proposals on a specific optical system of this digital holographic memory system, an S/N ratio or a bit error rate evaluation based on a volume multiplex recording method, or two-dimensional coding have been made. Also, studies have been made from a more optical engineering point of view such as influence of aberration of the optical system.

Referring to FIG. 12, a shift multiplex recording method which is one of the volume multiplex recording methods will be described (D. Psaltis, M. Levene, A. Pu, G. Barbastathis and K. Curtis; Opt. Lett. 20 (1995) p782). In the shift multiplex recording method, a signal light beam 131 and a spherical wave as a reference light beam 132 are simultaneously irradiated on a hologram recording medium 135, and the hologram recording medium 135 is formed in a shape of a disk, and a plurality of holograms are written over another in the same region by rotating the disk 135. For example, when a beam diameter is set to 1.5 mm, another hologram can be recorded in the substantially same region without generating crosstalk only by moving the disk 135 by several tens μm. This recording is based on a fact that, since the reference light beam 132 is the spherical wave, the movement of the disk 135 is equivalent to a change in an angle of the reference light beam 132.

As shown in the above reference, a moving distance of the spherical reference light wave shift multiplex recording, i.e. a distance δ in which the holograms can be independently separated from each other is given by the following formula (1).

$$\delta_{spherical} = \delta_{Bragg} + \delta_{NA} \approx (\lambda z_o / L \tan \theta_s) + \lambda/2(NA) \quad (1)$$

Where λ is a wavelength of the signal light beam, $z_o$ is the distance between an objective lens forming the spherical reference wave and a recording medium, L is a film thickness of the recording medium, $\theta_s$ is a crossed axes angle between the signal light beam and the spherical reference wave, and NA is a numerical aperture of the objective lens. As can be seen from the formula (1), the amount of shift δ is decreased as the film thickness L of the recording medium is increased, so that a degree of multiplexity can be increased and recording capacity can be increased.

In order to more efficiently increase the recording capacity in the shift multiplex recording method, the recording region is micronized. The volume multiplex recording having higher density can be realized by performing the multiplex recording in a microregion. For this purpose, the signal light beam is Fourier-transformed by a lens to irradiate the recording medium in the holographic memory system. Accordingly, in the case where an image of the signal light beam has a fine pitch (high spatial frequency), Fraunhofer diffraction occurs on a surface of the recording medium in the signal light beam, and spread ζ of its diffraction image is shown by the following formula (2).

$$\zeta = k\lambda f\omega_x \quad (2)$$

Where k is a constant of proportionality, λ is the wavelength of the signal light beam, f is a focal distance of the lens for Fourier transformation, and $\omega_x$ is the spatial frequency of the signal light beam.

When the lens having the small focal distance f is used as the lens for Fourier transformation, the recording region can be micronized. This is also shown in chapter 7 of "Holography" (The Institute of Electronics, Information and Communication Engineers). The applicant proposed a technique in which the recording region is decreased by recording, of the Fourier transform image, only the minimum Fourier transform component essentially required for data reproduction (Japanese Patent Application Laid-Open (JP-A) No. 2000-66565).

A phase correlation multiplexing method in which the shift multiplex recording is performed by arranging a random phase mask in an optical path of the reference light beam is known (see the specification of U.S. Pat. No. 5,719,691). In this method, Bragg condition of the recorded hologram is not considered, and complexity of a wavefront of the reference light beam is utilized. The different holograms can be multiplex-recorded in such a manner that the reference light beam having an extremely small auto-correlation function of the wavefront is utilized and the recording medium is shifted by the microamount (up to 10 μm). That is to say, the increase in the recording capacity can be realized.

A technique in which the random phase reference light beam used in the phase correlation multiplexing is generated by a holographic optical element (JP-A No. 2001-60394), or a skip-sort multiplexing method (JP-A No. 2002-40908) has been also proposed.

However, as shown in FIG. 1, the Fourier transform image has the infinite spread at a focal plane. Therefore, in the case where information of the signal light beam is recorded in the form of the hologram, a region larger than the region irradiated with the signal light beam has generally to be irradiated with the reference light beam so that the information is not lost. For example, in the case where the recording medium is irradiated using the spherical wave as the reference light beam in order to perform the shift multiplex recording, the circular region larger than the region exposed by the signal light beam is to be irradiated with the reference light beam. In the phase correlation multiplexing method, the irradiation with the reference light beam having the similar region relative to the signal light beam is performed.

However, in this case, the recording medium is also exposed in a region other than the region where the hologram is recorded, i.e. a region other than the region which has been irradiated with the signal light beam. The new hologram can not be recorded in such an excessively or unnecessarily exposed region and, as a result, there is generated the problem that the recording capacity is decreased.

In the shift multiplex recording method in which the spherical reference wave is utilized, there also arises a problem as described below. In the multiplex recording method, a reference light beam having a wavefront of a steep curvature is generated by using the objective lens having the large numerical aperture (NA). The degree of the multiplexity is increased by using this reference light beam for the recording. As a result, high-density recording is realized. Since the objective lens having high NA spreads the beam in a broad angle, when the reference light beam irradiating area is decreased, it is necessary that the objective lens approaches the recording medium.

As can be seen from the above formula (1), in order to increase the degree of the multiplexity, it is necessary to decrease NA of the objective lens and the distance L between the objective lens and the recording medium. However, when the objective lens approaches the recording medium, there arises a problem that the objective lens interferes with the optical path of the signal light beam to cause loss of some of the information of the signal light beam.

SUMMARY OF THE INVENTION

In view of the above-described circumstances, the present invention provides a hologram recording method which enables high-density hologram recording without causing loss of the information of the signal light beam.

In order to achieve the above-described object, in a first aspect of the invention, a hologram recording method comprises irradiating an optical recording medium with a signal light beam and a reference light beam which has a predetermined shape and intensity on the optical recording medium corresponding to an intensity distribution of the signal light beam on the optical recording medium.

In the hologram recording method of the aspect of the invention, since the reference light beam has the predetermined shape and intensity on the optical recording medium corresponding to the intensity distribution of the signal light beam on the optical recording medium, only the necessary region can be exposed and the excessive region will not be exposed. Accordingly, the hologram can be recorded without causing loss of information of the signal light beam and high-density recording can reliably be realized. For example, in the case where the intensity distribution of the reference light beam on the optical recording medium is substantially equal to the intensity distribution of the signal light beam, the unnecessary exposure can practically be eliminated.

The reference light beam may have a wavefront which is generated by using a computer-generated hologram. The computer-generated hologram is one in which a process of producing the hologram is simulated by a computing technology. In this case, actual existence of the recording wavefront is not always necessary, and an arbitrary wavefront designed by the computer can be reproduced. A kinoform in which only a phase of an object light beam is recorded can be used as the computer-generated hologram.

The kinoform has no light loss, so that the kinoform is preferable to generation of the reference light beam. It is preferable that the kinoform is designed so as to generate a reference light beam having a random phase. The shift multiplex recording method in which the phase correlation multiplexing is performed can be realized by using a reference light beam having a random phase.

It is preferable that the optical recording medium is irradiated with the signal light beam after the signal light beam has been Fourier-transformed with a lens. The recording density can be improved by recording a Fourier transform image in the form of the hologram. Particular, in the case where the signal light beam holds a two-dimensional digital data image, it is preferable that the hologram is recorded by using only a Fourier transform component in which a spread $\zeta$ from a zero-order light beam of the Fourier transform image of the signal light beam is defined by the following formula:

$$0 \leq \zeta \leq 4f\lambda/d$$

where f is a focal distance of the lens for irradiating the optical recording medium with the signal light beam, $\lambda$ is a wavelength of the signal light beam, and d is one side length of one bit data of the signal light beam.

Thus, the recording region can be decreased in such a manner that the hologram is recorded by using only the minimum Fourier transform component essentially required for data reproduction.

In a second aspect of the invention, a hologram recording apparatus comprises a light source for outputting a coherent light beam, a spatial light modulator for modulating the light beam from the light source in accordance with data and generating a signal light beam, and a holographic optical element for generating a reference light beam having a predetermined shape and intensity on an optical recording medium corresponding to an intensity distribution of the signal light beam on the optical recording medium, from the coherent light beam outputted from the light source, wherein a hologram is recorded by irradiating the optical recording medium with the signal light beam and the reference light beam.

In the hologram recording apparatus of the aspect of the invention, the coherent light beam outputted from the light source is modulated according to data by the spatial light modulator and the signal light beam is generated. The optical recording medium is irradiated with the signal light beam. The reference light beam having the predetermined shape and intensity on the optical recording medium corresponding to the intensity distribution of the signal light beam on the optical recording medium is also generated from the coherent light beam outputted from the light source. The reference light beam is generated by the holographic optical element, and the optical recording medium is irradiated with the reference light beam and the signal light beam at the same time.

As described above, according to the hologram recording apparatus of the aforementioned aspects of the invention, the reference light beam generated by the holographic optical element has the predetermined shape and intensity on the optical recording medium corresponding to the intensity distribution of the signal light beam on the optical recording medium, so that only the necessary region can be exposed and other regions are reliably prevented from being unnecessarily exposed. Accordingly, the hologram can be recorded without causing loss of the information of the signal light beam, and the high-density recording can be realized.

BRIEF DESCRIPTION OF THE DRAWINGS

FIG. 5 shows one of two-dimensional digital data images displayed by using a differential coding method.

FIG. 6 shows the Fourier transform image of the signal light beam which holds the data image shown in FIG. 5.

DETAILED DESCRIPTION OF THE INVENTION

An embodiment of the invention will be described in detail hereinbelow referring to the accompanying drawings.

(Micronization of Recording Region)

Figure 2:
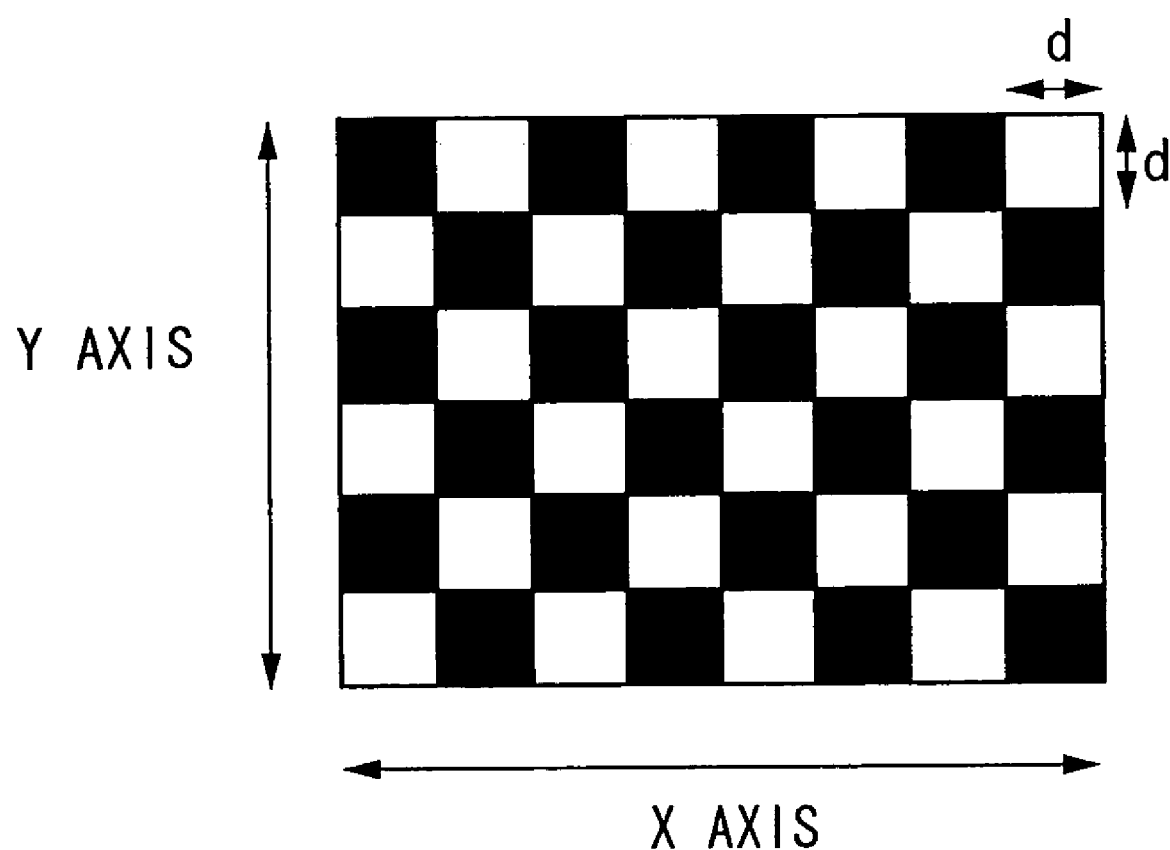
FIG. 2 shows one of data images to be recorded.
Figure 3:
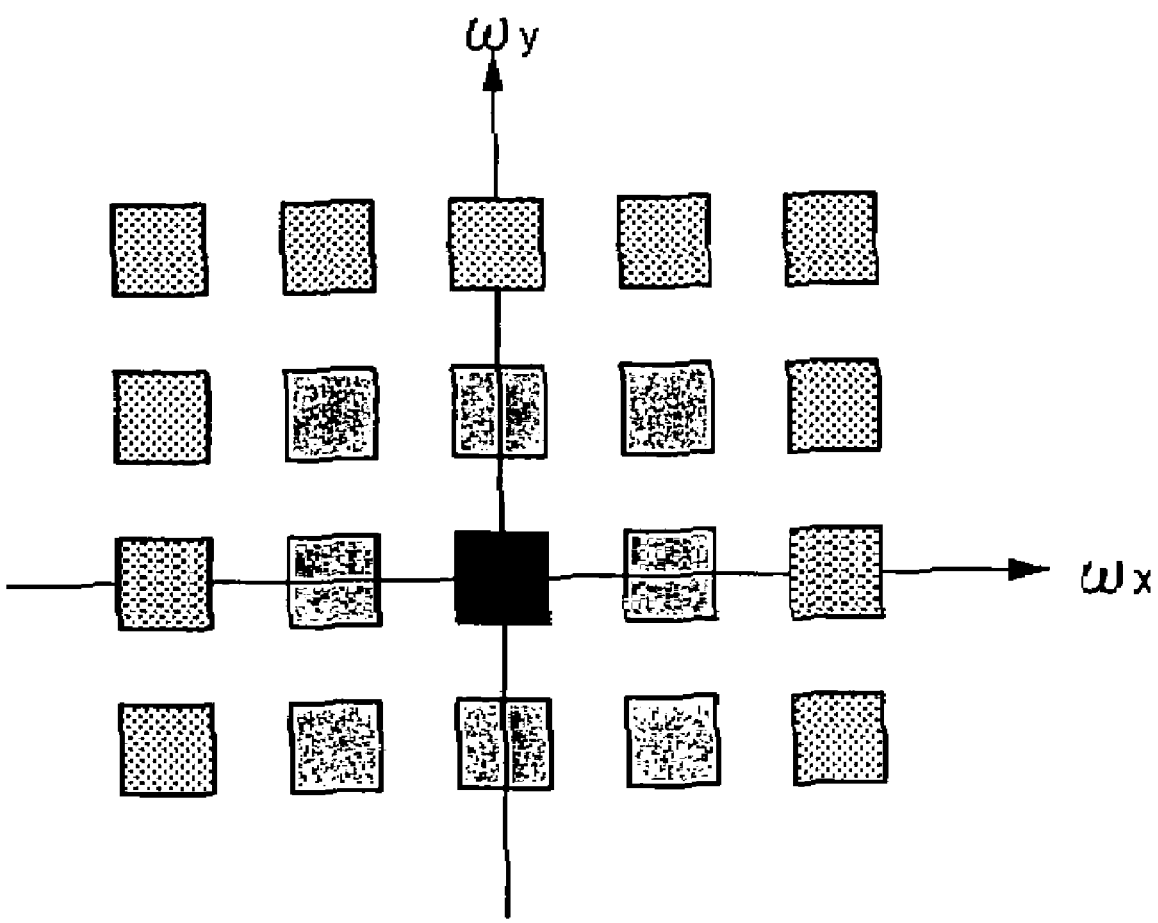
FIG. 3 shows a Fourier transform image of the signal light beam which holds the data image shown in FIG. 2.

For example, an image as shown in FIG. 2 is adopted as a data page to be recorded as the hologram. A white part in FIG. 2 indicates data "1" and a black part in FIG. 2 indicates data "0". This allows binary digital data to be recorded in each page. In this case, a size of one pixel of d by d corresponds to one bit data. In the case where such data image as described above is recorded in the form of the hologram, a Fraunhofer diffraction image of the data image is recorded by the lens in order to improve the recording density. As the Fraunhofer diffraction image of the data image is proportional to the Fourier transformation of an amplitude distribution of the data image, the Fraunhofer diffraction image is referred to as a Fourier transform hologram. FIG. 3 shows the Fourier transform image of the data image shown in FIG. 2.

Recording the digital data at high density can be made possible by packing bit data as much as possible in each page by decreasing an area of one pixel of the data image shown in FIG. 2, i.e. by decreasing a value of d. Accordingly, in addition to the high-density recording, the recording and reproducing at a high speed can be realized. However, when the area of one pixel is decreased, the Fourier transform image of the data image (signal light beam) spreads on the recording medium according to the above formula (2). This is attributed to an increase in a spatial frequency $\omega_x$ ($\propto 1/d$) when the size of the data image of signal light beam becomes small, i.e., when d is decreased. The spread of the Fourier transform image disturbs the high-density recording.

The method of decreasing a wavelength λ, the method of forming the Fourier transform image of the signal light beam by using the lens having a short focal distance f, and the like have been proposed as the method of avoiding the spread of the Fourier transform image. However, even if the Fourier transform image is decreased by shortening the wavelength of the light source or the focal distance of the lens, the Fourier transform image fundamentally has the infinite spread on the focal plane. Therefore, the present invention proposes that, in the Fourier transform image shown in FIG. 3, only the minimum Fourier transform component essentially required for the data reproduction is recorded. This enables the micronization of the recording region to be recorded.

The spread in an x-axis direction of the Fourier transform image shown in FIG. 3 corresponds to the spatial frequency $\omega_x$ ($\propto 1/d$) in the x-axis direction of the data image shown in FIG. 2. When the Fourier transform image shown in FIG. 3 is seen in the x-axis direction, the Fourier transform image spreads toward positive and negative directions in symmetrical with respect to a zero-dimensional light beam ($\omega_x=0$). The spread in the y-axis direction is similar to that in the x-axis direction. Thus, the spatial frequency has positive and negative values.

Since the Fourier transform image of the signal light beam includes many spatial frequency components originating from a pixel pitch of the signal light beam, even if a harmonic component is cut, the signal light beam can be reproduced without error. Explanation of this phenomenon is as follows: assuming that the spatial frequency of the image data initially takes an adequately normalized value, the Fraunhofer diffraction image shown in FIG. 3 becomes the Fourier transform image of the signal light beam itself, so that k in the formula (2) is 1 and the spread ζ of the Fraunhofer diffraction image is indicated by the following formula (3).

$$\zeta = \lambda f \omega_x \quad (3)$$

When a trial calculation of the spread ζ of the diffraction image is made by substituting the parameters of the formula (3) with the specific numerical values, for example, in the case where the wavelength λ is 532 nm, the focal distance f is 50 mm, and the spatial frequency $\omega_x$ is 71 lines/mm (corresponding to the pixel of 14 μm by 14 μm), the spread ζ of the diffraction image becomes about 2 mm, and the spread ζ of the diffraction image becomes 4 mm by considering the positive component and the negative component.

In consideration of the experiment results obtained by the present inventors, recording only the zero-order to the second-order components in the positive and negative directions of the Fourier transform image satisfactorily miniaturizes the recording region and enhances the S/N ratio high in reproduction. That is to say, the miniaturization of the recording region can be achieved without losing the data by effecting the hologram recording, with the reference light beam, of the Fourier transform component in which component the spread ζ from the zero-order light beam of the Fourier transform image of the signal light beam is defined by the following formula (4).

$$0 \leq \zeta \leq 4 f \lambda / d \quad (4)$$

The recording region can be miniaturized to the smallest size by recording only the zero-order component of the Fourier transform image. However, in this case, the loss of data occurs and the data image of the signal light beam can not be read out. In order prevent loss of data, it is necessary to record at least the zero-order and first-order components of the Fourier transform image.

When the Fourier transform image including the high order components such as a fourth order and a fifth order is recorded, the data image of the signal light beam can be read out at a high S/N ratio. However, then the recording region cannot be sufficiently miniaturized and the recording capacity cannot be sufficiently increased.

In practice, when the Fourier transform image including component thereof up to the first order is recorded, reading error is substantially eliminated during reproducing the data image. Further, when the recording including up to the second-order or third-order component is performed, the data image of the signal light beam can be read at a sufficiently high S/N ratio.

(Hologram Recording Method of the Invention)

A light intensity distribution is generated by interference between the signal light beam and the reference light beam in the hologram recording. In the recording medium, the light intensity distribution is recorded in the form of the hologram by a change in a refractive index or an absorption index.

In the case where the Fourier transform hologram is recorded, the hologram recording is generally performed at a defocused position where the recording medium is slightly shifted from the focal position of the lens in order to suppress the intensity of the zero-order diffraction light beam of the signal light beam on the recording surface. The signal light beam is condensed to a certain degree by the lens, and the recording medium is irradiated with the signal light beam. A diffraction pattern corresponding to a pattern (periodicity) of the data image appears on the recording surface. The spread of the diffraction pattern is maximized when the data image is a random pattern.

Figure 1:
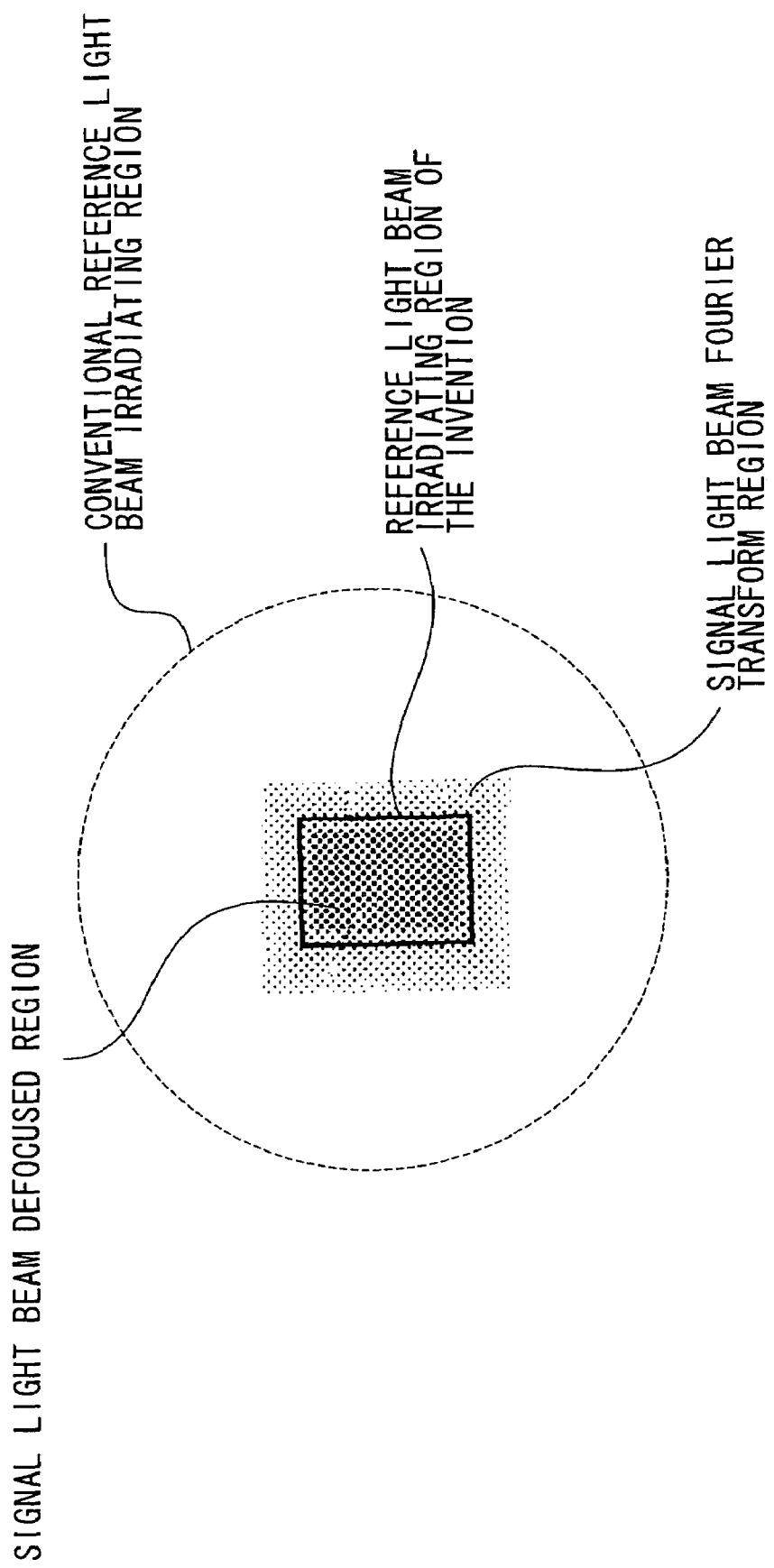
FIG. 1 is a schematic view showing a relationship between a signal light beam irradiation region and a reference light beam irradiation region.

In the conventional method, the relatively broad region is irradiated with the reference light beam so that the broad region covers the whole region irradiated with the signal light beam. For example, in the case where the shift multiplex recording is performed, as shown in FIG. 1, a circular region larger than the signal light beam irradiating region is irradiated with the reference light beam. In this case, the recording medium is also exposed in the region outside the region where the hologram is recorded, i.e. in the region outside the region which is irradiated with the signal light beam. The hologram cannot be newly recorded in the unnecessarily exposed region. As a result, there is generated the problem that the recording capacity is decreased.

In the recording method of the invention, the hologram is recorded by irradiating the recording medium with the reference light beam corresponding to the intensity distribution of the signal light beam on the recording medium. For example, the reference light beam having the substantially same intensity distribution as the signal light beam is generated, and only the substantially same region as the region irradiated with signal light beam (signal light beam defocused region) shown in FIG. 1 is irradiated with the reference light beam. Accordingly, only the necessary region can be exposed and the regions which need not be exposed will not be exposed.

Therefore, the hologram can be recorded without causing loss of the information of the signal light beam, and the high-density recording can be realized.

As shown in FIG. 1, the Fourier transform image has the infinite spread (i.e., the signal light beam Fourier region) on the focal plane. However, as described above, the miniaturization of the recording region can be sufficiently achieved when, of the Fourier transform image, only the minimum Fourier transform component essentially required for the data reproduction is recorded. Accordingly, only the region corresponding to the minimum Fourier transform component essentially required for the data reproduction may be irradiated with the signal light beam and the reference light beam.

(Method of Generating Reference Light Beam)

The computer-generated hologram can be utilized for the generation of the reference light beam having an arbitrary wavefront. The computer-generated hologram is one in which the amplitude and phase distributions of an object light beam from a virtual object are calculated by the computer and recorded in the recording medium by the proper method. In the computer-generated hologram, it is not necessary that the recording wavefront really exists, and an arbitrary wavefront represented by a mathematical formula can be reproduced.

In the holographic technology, the diffraction light beams of the order 0, the order +1, and the order −1 are simultaneously generated from the hologram during the reproduction. One of the first-order diffraction light beams is utilized as the reproducing image and the other two diffraction light beams are not utilized. Therefore, utilization efficiency of the light is low at the reproducing process.

The kinoform is a kind of the computer-generated holograms, in which only the phase in the amplitude and the phase of the object light beam is recorded to reproduce the image. In the kinoform, only the diffraction light beam which contributes to the reproducing image is obtained and other unnecessary diffraction light beams are not generated, whereby the loss caused by the absorption or the diffraction of the light hardly occurs and extremely bright reproducing image can be obtained. Accordingly, the kinoform is preferable for the generation of the reference light beam.

In producing the kinoform, at first a transparent object illuminated with diffuse light is assumed, and the phase distribution is determined by calculation on a plane in which the kinoform is recorded when the amplitude of the diffraction light beam is set at constant. The phase distribution is determined so that the phase distribution stays within the range of 0 to $2\pi$ by changing the integer by which $2\pi$ is multiplied. Then, the phase distribution determined by the calculation is recorded in the recording medium by the proper method.

For example, it is assumed that the amplitude distribution and the phase distribution of diffraction light $\Sigma$, which reaches the recording surface at which the kinoform is to be formed from the object illuminated with the diffuse light, are calculated to obtain the result shown by the following formula (5).

$$\Sigma = A_0(x,y) \exp\{i\phi_0(x,y)\} \qquad (5)$$

where (x,y) is an orthogonal coordinate having an origin as the center of the recording surface, $A_0(x,y)$ is the amplitude distribution, and $\phi_0(x,y)$ is the phase distribution.

Since the object is illuminated with the diffuse light, the amplitude distribution $A_0(x,y)$ of the diffraction light is approximated at constant and the phase distribution $\phi_0(x,y)$ is quantamized relative to a sample point of the recording surface. Since it is difficult that the quantamized phase distribution is directly given as the phase change of the kinoform, for example, the phase distribution is recorded by the method shown below.

The phase distribution $\phi_0(x,y)$ of the diffraction light is converted into a gradation image of a half tone by, e.g. a mask, the spatial light modulator, or the like, and the converted phase distribution $\phi_0(x,y)$ is exposed to a photolithographic material or the like in a reduced scale. Projections and depressions corresponding to the gradation image are formed through a developing process. The desired phase change is realized by the projections and depressions. It will be acceptable that only the phase is directly modulated by the spatial light modulator so that the desired phase change is obtained.

In order to obtain the reference light beam having the shape and the intensity in accordance with the profile of the signal light beam, it is necessary to design the kinoform in advance. The various kinds of the method of designing the kinoform have been proposed, and Gerchberg-Saxton (GS) method will be described here. In the GS method, the calculation is relatively easy to perform and a convergent property is good.

Figure 4:
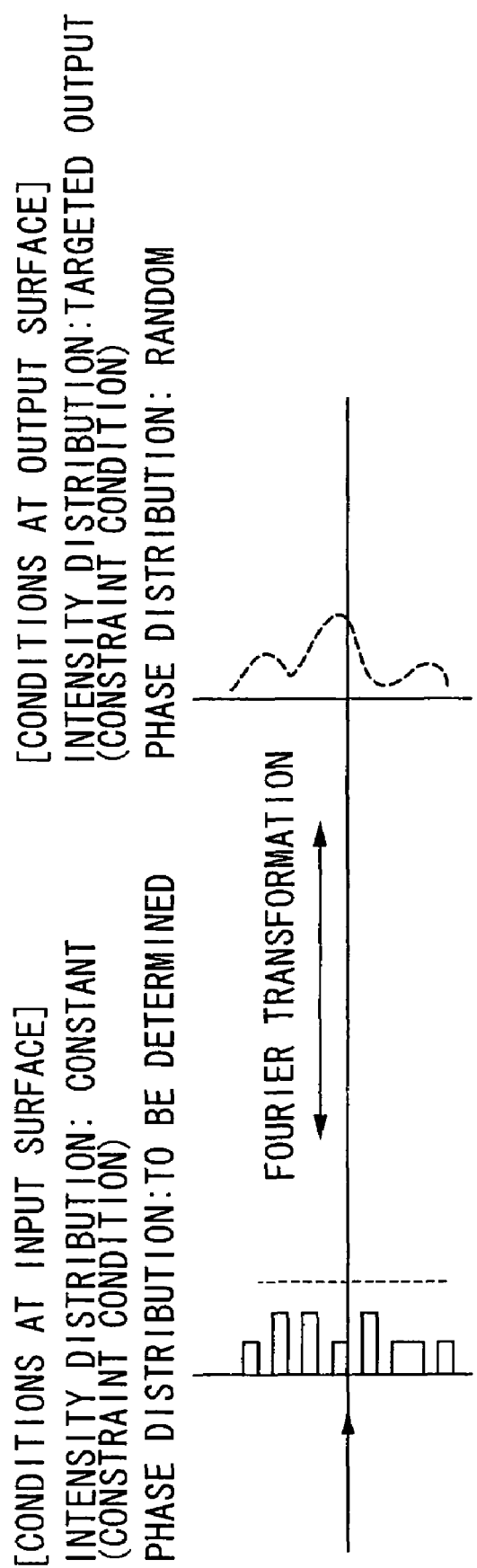
FIG. 4 is a view illustrating a method of designing a kinoform (GS method).

As shown in FIG. 4, in the GS method, the intensity distribution is made constant as a constraint condition at an input surface and the target intensity distribution (image) and the random phase distribution are set as the constraint conditions at an output surface, so that the phase distribution required at the input surface is determined by a Fourier iterative algorithm. In FIG. 4, the intensity distribution is indicated by dot lines and the phase distribution is indicated by solid lines.

When the holographic optical element, in which the kinoform designed in the above-described way has been recorded, is arranged in an optical path of the reference light beam, the light beam incident to the recording medium is Fourier-transformed by propagating through the element to become the reference light beam having the target intensity distribution and the random phase distribution, and the recording medium is irradiated with the reference light beam. Accordingly, the desired light intensity distribution can be obtained on the recording surface.

When the kinoform designed by the GS method is used, the phase distribution at the output surface is randomized. That is to say, the phase of the reference light beam is random. Accordingly, similarly to the phase correlation multiplexing method, the advantage that the multiplex recording is performed by the microshift can be obtained.

FIG. 5 shows one of the two-dimensional digital data images formed by using a differential coding method. The differential coding method is one in which the data "0" of the digital data image is indicated by "bright-dark" using two pixels of the spatial light modulator, and the data "1" is indicated by "dark-bright". The differential coding method has a feature that the method significantly prevents geration of noises because the signal is read in the form of the derivative value of the light intensity.

Figure 7:
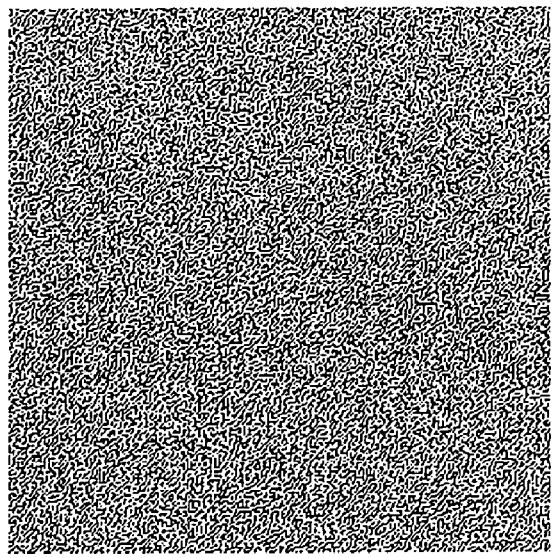
FIG. 7 shows a phase distribution on an output surface of the kinoform which has been designed to have the same intensity distribution as the Fourier transform image shown in FIG. 6.

FIG. 6 is the Fourier transform image of the signal light beam holding the two-dimensional digital data image shown in FIG. 5. As can be seen from FIG. 6, a vertical stripe appears corresponding to the differentially-coded pattern in the Fourier plane. The kinoform is designed by the GS method so as to have the same intensity distribution as the Fourier transform image of the signal light beam shown in FIG. 6. FIG. 7 shows the phase distribution of the kinoform at the output surface.

Figure 8:
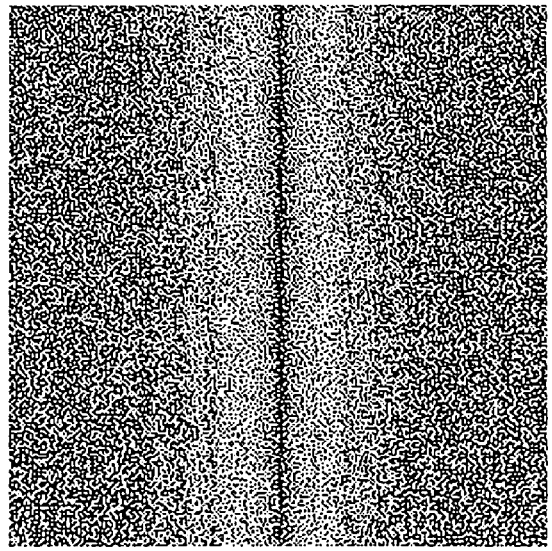
FIG. 8 shows the intensity distribution of reference light beam generated by a holographic optical element in which the designed kinoform has been recorded.

When the holographic optical element in which the designed kinoform has been recorded is arranged in the optical path of the reference light beam, the diffraction pattern shown in FIG. 8 is obtained. As can be seen from FIG. 8, in the recording surface, the intensity distribution of the signal light beam shown in FIG. 6 substantially coincides with the intensity distribution of the reference light beam which is generated by the holographic optical element.

(Hologram Recording and Reproducing Apparatus)

The hologram recording and reproducing apparatus, in which the hologram is recorded by applying the hologram recording method of the invention and the recorded hologram is reproduced, will be described below referring to FIG. 9.

A laser 10 oscillating the laser beam which is of the coherent light is provided in the hologram recording and reproducing apparatus. A polarizing beamsplitter 16 is arranged on a laser beam irradiating side of the laser 10. The polarizing beamsplitter 16 separates the laser beam into two light beams of the light beam for the reference light beam and the light beam for the signal light beam by transmitting a P-polarized light beam and reflecting an S-polarized light beam.

A reflecting mirror 18, which reflects the laser beam for the reference light beam to deflect the optical path thereof toward a direction of the hologram recording medium, and an objective lens 20 which condenses the reference light beam are arranged in order on a light reflection side of the polarizing beamsplitter 16. The lens 20 is arranged so that the lens 20 can be introduced into the optical path and retreated from the optical path. It is acceptable that the recording surface is directly irradiated with the reference light beam after the lens 20 has been retreated. Alternatively, the recording surface may be irradiated with the reference light beam after the lens 20 is introduced to convert the reference light beam into an appropriate size by the lens 20.

A holographic optical element 100 in which the kinoform has been recorded is arranged between the polarizing beamsplitter 16 and the reflecting mirror 18. The kinoform is designed so that a reference light beam having random phase distribution, as well as the shape and intensity corresponding to the profile of the signal light beam, is generated.

An x-z stage 22 is provided on a laser beam condensing side of the objective lens 20. The x-z stage 22 includes a stepping motor for rotating a hologram recording medium 24 formed in the shape of a disk in a z-plane. The hologram recording medium 24 is irradiated with the S-polarized light beam as the reference light beam through the objective lens 20.

A shutter 12 for blocking the P-polarized light beam transmitted through the polarizing beamsplitter 16 is arranged on a light beam transmission side of the polarizing beamsplitter 16 so that the shutter 12 can be introduced into/retreated from the optical path.

A reflecting mirror 28 and a lens system including lenses 30, 32, and 34 are arranged in order on the light beam transmission side of the shutter 12. The reflecting mirror 28 reflects the laser beam for signal light beam at a reflection angle of 45° to deflect the optical path thereof toward the direction of the hologram recording medium.

A transmission type of spatial light modulator 36 is arranged between the lens 32 and the lens 34. The spatial light modulator 36 includes a liquid crystal display element and the like, and modulates the laser beam for the signal light beam in accordance with the supplied recording signal in each page to generate the signal light beam for effecting recording on each page of the hologram.

The lenses 30 and 32 collimate the laser beam to form the light beam having a larger diameter, and the spatial light modulator 36 is irradiated with the collimated light beam having the larger diameter. The lens 34 condenses the P-polarized light beam, which has been modulated by and transmitted through the spatial light modulator 36, on the hologram recording medium 24, for forming the signal light beam. In recording the hologram, the hologram recording medium 24 is simultaneously irradiated with the signal light beam and the reference light beam.

Since the P-polarized light beam is used as the signal light beam and the S-polarized is used as the reference light beam, the polarization direction of the signal light beam is orthogonal to the polarization direction of the reference light beam at the time when each page of the hologram is recorded.

It is acceptable that the S-polarized light beam is used as the signal light beam and the P-polarized light is used as the reference light beam. Further, it is acceptable that the signal light beam and reference light beam whose polarization planes are parallel to each other is used. Yet further, it is acceptable that circularly polarized light beams which are rotated in directions different from each other is used as the signal light beam and the reference light beam, respectively.

A lens 38, an analyzer 44 which selects a light beam in a predetermined polarization direction (for example, 0° polarized component, 45° polarized component, or 90° polarized component) from the reproducing light beams and allows the selected light beam to transmit itself, and a detector 40 which includes an imaging device such as CCD and converts the received reproducing light beam into an electric signal to output the signal, are arranged on a reproducing light beam transmission side of the hologram recording medium 24. The detector 40 is connected to a personal computer 42. The analyzer 44 is arranged so as to remove the scattering noise caused by the reference light beam in the reproduction, and the analyzer can be omitted in the case of the little scattering.

The personal computer 42 is connected to the spatial light modulator 36 by way of a pattern generator 46 which generates a pattern in accordance with the recording signal supplied from the personal computer 42 at predetermined timing.

The personal computer 42 is connected to a driving device 48. The driving device 48 drives the shutter 12 so that the shutter 12 is introduced into the optical path. Or, the driving device 48 makes the shutter 12, which has been introduced into the optical path, retreat from the optical path. Further, the personal computer 42 is connected to a driving device 50 which drives the x-z stage 22.

Next, hologram recording processing and hologram reproducing processing in which the above hologram recording and reproducing apparatus is used will be described below.

In recording the hologram, while the personal computer 42 drives the driving device 48 to make the shutter 12 retreat from the optical path so that the laser beam can pass through, the driving device 50 drives the stepping motor of the x-y stage 22 to rotate the hologram recording medium at predetermined rotational speed.

The laser beam oscillated from the laser 10 is separated into two light beams by the polarizing beamsplitter 16. The laser beam transmitted through the polarizing beamsplitter 16 is reflected by the reflecting mirror 28 and collimated by the lenses 30 and 32. The spatial light modulator 36 is irradiated with the resulting laser beam for the signal light beam.

The pattern generator 46 generates a pattern in accordance with the recording signal supplied from the personal computer 42 and inputs the pattern to the spatial light modulator 36. The personal computer 42 supplies the recording signal of each page at the predetermined timing so that each page of the hologram is recorded from the recording start position with an interval of the amount of shift δ, while the hologram recording medium 24 is rotated.

In the spatial light modulator 36, the laser beam for the signal light beam is intensity-modulated in accordance with the generated pattern and the signal light beam is generated. The Fourier transformation is performed to the generated signal light beam by the lens 34 and then the hologram recording medium 24 is irradiated with the resulting signal light beam.

At the same time, the holographic optical element 100 is irradiated with the laser beam reflected from the polarizing beamsplitter 16 as the laser beam for the reference light beam. In the holographic optical element 100, the reference light beam is generated from the laser beam for the reference light beam. In the reference light beam, the phase is random and the shape and intensity are provided in accordance with the profile of the signal light beam.

The generated reference light beam is condensed by the lens 20, to be irradiated on a region in the hologram recording medium 24, which region is also irradiated with the signal light beam which has been Fourier-transformed. This allows the signal light beam and the reference light beam to interfere with each other in the hologram recording medium 24, and the Fourier transform hologram is recorded in the hologram recording medium 24. The holograms of the plurality of pages can be recorded in the same region, with the holograms overlapped, by carrying out the recording in a manner that the disk-shaped hologram recording medium 24 is rotated during the recording.

When the wavelength of the laser beam, a film thickness of the recording medium, NA of the objective lens, and the like are properly set, only by rotating the disk so that the recording position is moved by the predetermined amount of shift δ, the hologram of one page can be recorded in and reproduced from the substantially same region as the previous page of the disk without crosstalk between the hologram of the one page and the hologram of the previous page which has been already recorded.

In the case where the reference light beam has the random phase, by setting the amount of shift δ to a value not more than 100 μm, the new hologram can be recorded in the recording position different from the recording position of each page which has been already recorded.

Figure 11:
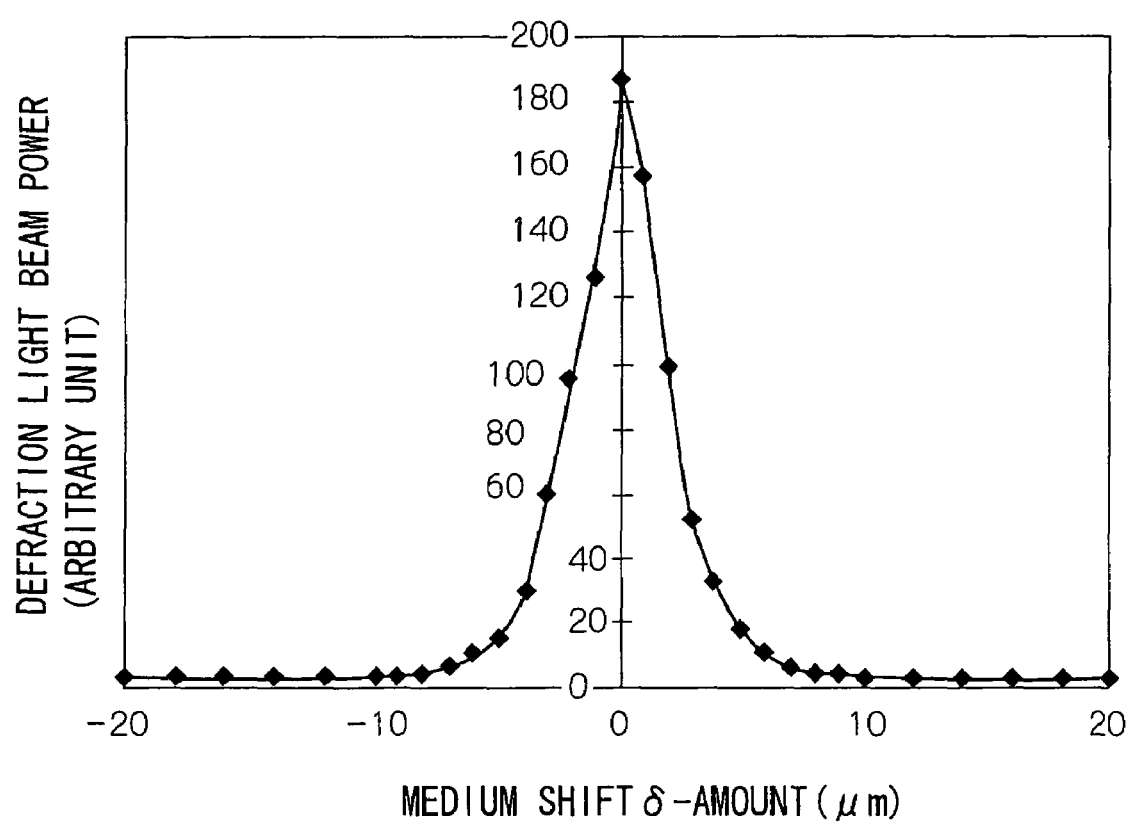
FIG. 11 is a graph showing a medium shift amount dependence of diffraction intensity on the hologram recorded in the embodiment.
Figure 12:
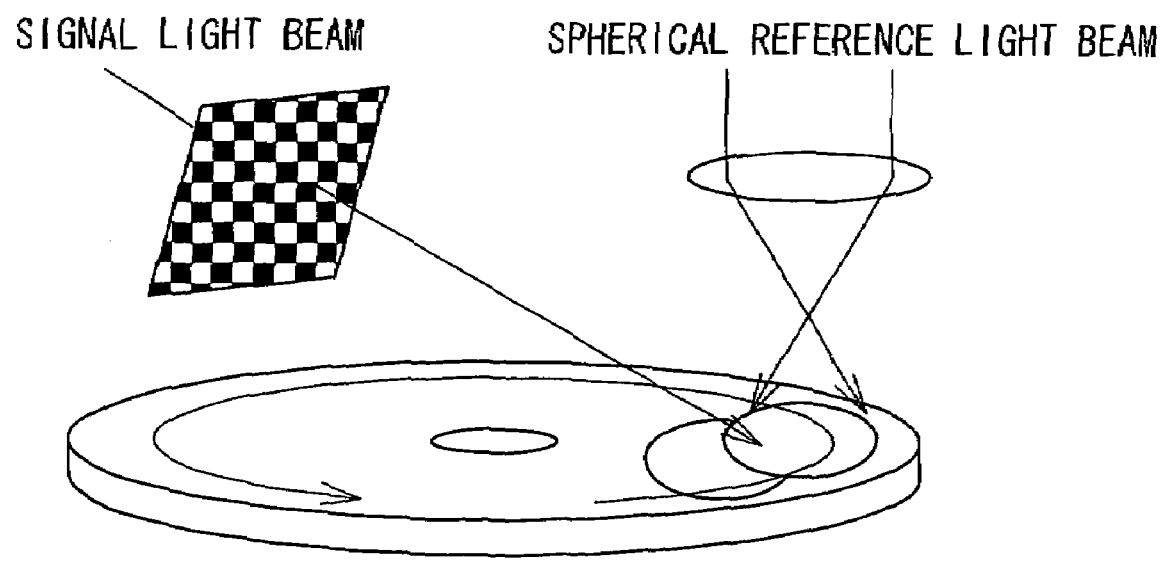
FIG. 12 is a view illustrating a shift multiplex recording method.

FIG. 11 shows a graph in which the hologram is recorded by using the reference light beam of the invention and then diffraction light power is examined while the position of the hologram is shifted. It can be seen from FIG. 11 that the diffraction light disappears when the amount of shift δ is not more than 10 μm. The new hologram can be multiplex-recorded by setting the shift δ at the amount of shift where the diffraction light disappears.

Next the hologram reproducing processing will be described. In reproducing the hologram, the personal computer 42 drives the driving device 48 to introduce the shutter 12 into the optical path. This allows the laser beam which has been transmitted through the polarizing beamsplitter 16 to be blocked by the shutter 12, so that the hologram recording medium 24 in which the hologram is recorded is irradiated with only the reference light beam.

The reproducing light beam diffracted by the hologram recording medium 24 is reversely Fourier-transformed by the lens 38, and only the reproducing light beam having a predetermined polarized component is selectively transmitted through the analyzer 44 and imaged on the detector 40. The reproducing light beam received by the detector 40 is converted into an electric signal by the detector 40. The obtained electric signal is inputted in the personal computer 42, and the reproduced data image is displayed on a display (not shown) provided in the personal computer 42.

EXAMPLE

The recording and the reproducing of the hologram were tried by adopting the above-described method.

Any material can be used for the hologram recording medium as long as a hologram can be recorded in the material. Polyester having cyanoazobenzene in its side chain, as expressed by the following chemical formula, was used for the hologram recording medium. As described in detail in the Japanese Patent Application No. 10-32834, in this material, the hologram can be recorded, reproduced, and erased by photoinduced anisotropy (photoinduced birefringence, photoinduced dichroism) due to photoisomerization of cyanoazobenzene of the side chain.

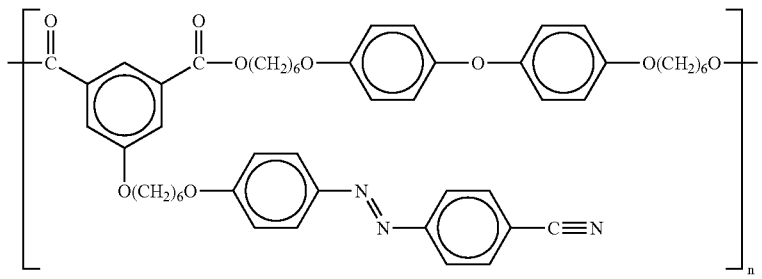

Figure 9:
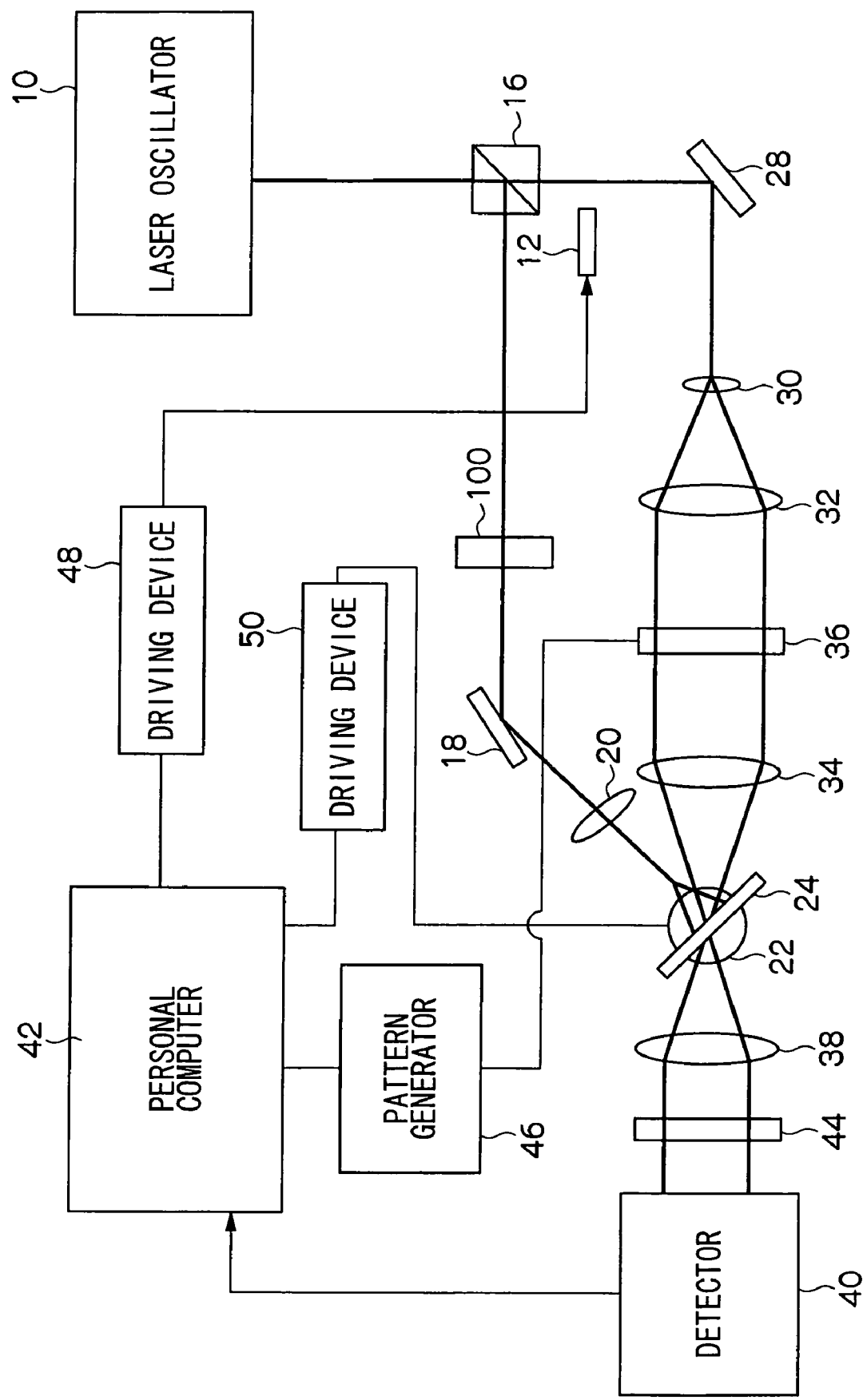
FIG. 9 is a schematic view showing a configuration of a hologram recording and reproducing apparatus used in the embodiment.

The hologram recording and reproducing apparatus shown in FIG. 9 was used in order to record and reproduce the hologram. A YAG:YVO$_4$ laser which oscillates a laser beam having the wavelength of 532 nm was used for the laser 10. Polyester having cyanoazobenzene in its side chain, which forms the hologram recording medium 24, has sensitivity to the laser beam having the wavelength of 532 nm.

A liquid crystal panel for a projector was used as the spatial light modulator 36. The liquid crystal panel had 1024 by 768 pixels, and a size of one pixel was 14 μm by 14 μm. One pixel was set to one bit, and a chessboard pattern shown in FIG. 2 was formed and inputted in the spatial light modulator 36. Accordingly, the data image which is held by the signal light beam has the spatial frequency component corresponding to a pitch of d=14 μm.

The lens having the focal distance f of 50 mm was used as the lens 38 for performing the Fourier transformation of the signal light beam. In this case, a region A corresponding to the minimum Fourier transform component essentially required for the data reproduction is expressed by the following formula (6).

$$0 < A < (4\lambda f/d)^2 \qquad (6)$$

At this point, the region A was set so as to contain both the positive and negative components of a Fourier spectrum. When the wavelength λ is set to 532 nm, the focal distance f is set to 50 mm, and one side length d of one bit data of the signal light beam is set to 14 μm, the region A is a square of 8 mm by 8 mm.

The holographic optical element 100 was produced by designing a kinoform so that only the square region A represented by the formula (6) was irradiated with the reference light beam having the random phase, and by drawing the kinoform. The holographic optical element 100 was arranged on the optical path of the reference light beam, and the Fourier transform hologram was recorded by irradiating the region A on the hologram recording medium 24 with the signal light beam and the reference light beam at the same time.

Figure 10:
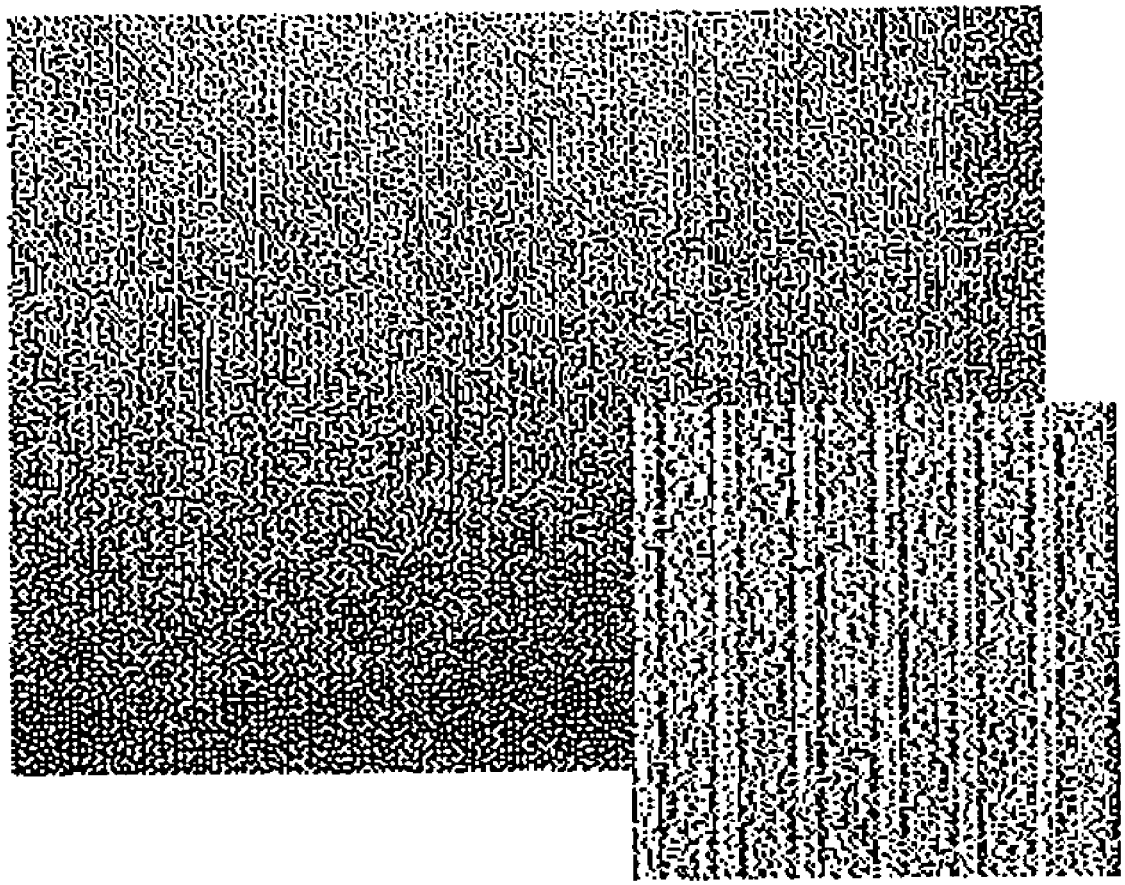
FIG. 10 is the data image reproduced from the hologram recorded in the embodiment.

Then, the data reproduction was attempted from the recorded hologram in such a manner that the hologram recording medium 24 was irradiated with the reading light beam which was the same light beam as the reference light beam used in recording the Fourier transform hologram. FIG. 10 shows the data image reproduced on the display. The same chessboard pattern as the signal light beam is sharply reproduced in the data image shown in FIG. 10.

As can be seen from this result, when the reference light beam-irradiating region substantially coincides with the signal light beam-irradiating region, the hologram can be recorded and reproduced without losing the information of the signal light beam. Accordingly, the region excessively or unnecessarily exposed by the reference light beam is not generated and thus the recording density is improved.

Next, the diffraction light intensity was determined from the recorded hologram, while the hologram recording medium 24 was slightly moved. The result is shown in FIG. 11. It is clear from FIG. 11 that the diffraction light disappears when the amount of shift δ of the hologram recording medium 24 reaches approximately 10 μm. Accordingly, the hologram can be multiplex-recorded, while the hologram recording medium 24 is shifted by 10 μm.

The diffraction light disappears when the amount of microshift δ is about 10 μm, because the reference light beam then has the random phase. By micronizing the amount of shift δ, a degree of multiplexity is increased and the recording density is dramatically improved. For example, in the case where the recording is performed in the square recording region of 8 mm by 8 mm while the recording region is shifted by 10 μm, the recording of 800 multiplexities can be performed in the same volume.

In the above-described embodiment, one of the shift multiplex recording methods in which the hologram recording medium is rotated has been explained. However, it is also possible that the shift multiplex recording is performed by linearly moving the hologram recording medium. Further, it is also possible that the signal light beam and the reference light beam scan the hologram recording medium, instead of rotating or linearly moving the hologram recording medium.

As described above, according to the invention, the excellent advantage that the high-density recording can be realized without losing the information of the signal light beam can be obtained in the hologram recording.

What is claimed is:

1. A hologram recording method comprising irradiating an optical recording medium with a signal light beam and a reference light beam which has a predetermined shape and intensity on the optical recording medium corresponding to an intensity distribution of the signal light beam on the optical recording medium, wherein:
the signal light beam holds a two-dimensional digital data image and has been Fourier transformed by a lens;
the intensity distribution of the reference light beam on the optical recording medium substantially coincides with the intensity distribution of the signal light beam; and
the reference light beam has a wavefront which is generated by using a computer-generated hologram, the computer-generated hologram being a kinoform in which only a phase of an object light beam is recorded; and wherein:
the hologram is recorded by using only a Fourier transform component of the signal light beam in which a spread ζ from a zero-order light beam of the Fourier transform image of the signal light beam is defined by the following formula:

$$0 \leq \zeta \leq 4f\lambda/d$$

where f is a focal distance of the lens for irradiating the optical recording medium with the signal light beam, λ is a wavelength of the signal light beam, and d is a length of one side of one bit data of the signal light beam.

2. The hologram recording method according to claim 1, further comprising designing the kinoform so as to generate the reference light beam having a random phase.

3. The hologram recording method according to claim 1, further comprising supplying a recording signal of each page with predetermined timing so that each page of the hologram is recorded from a recording start position at an interval of a predetermined amount of shift.

4. The hologram recording method according to claim 3, further comprising performing shift multiplex recording by rotating the optical recording medium.

5. The hologram recording method according to claim 3, further comprising performing the shift multiplex recording by moving the optical recording medium in line.

6. A hologram recording method comprising:
setting a region A corresponding to the minimum Fourier transform component essentially required for data reproduction to the range of the following formula (6), $$0 < A < (4f\lambda/d)^2 \qquad (6)$$

where f is the focal distance of the lens for irradiating the optical recording medium with the signal light beam, λ is the wavelength of the signal light beam, and d is a length of one side of one bit data of the signal light beam;
designing the kinoform so that only the region A is irradiated with the reference light beam having the random phase;
generating the reference light beam by using the computer-generated hologram in which the kinoform has been recorded; and
irradiating an optical recording medium with a sianal light beam that has been Fourier transformed by a lens and the reference light beam which has a predetermined shape and intensity on the optical recording medium corresponding to an intensity distribution of the signal light beam on the optical recording medium, wherein;
the intensity distribution of the reference light beam on the optical recording medium substantially coincides with the intensity distribution of the signal light beam; and
the reference light beam has a wavefront which is generated by using a computer-generated hologram, the computer-generated hologram being a kinoform in which only a phase of an object light beam is recorded.

7. The hologram recording method according to claim 6, further comprising supplying a recording signal of each page with predetermined timing so that each page of the hologram is recorded from a recording start position at an interval of a predetermined amount of shift.

8. A hologram recording method comprising:
(a) separating a laser beam into a light beam for a reference light beam and a light beam for a signal light beam;
(b) setting a region corresponding to a Fourier transform component essentially required for data reproduction;
(c) designing a kinoform so that only the region is irradiated with the reference light beam having a random phase;
(d) generating the reference light beam from the light beam for the reference light beam by using a computer-generated hologram in which the kinoform is recorded;
(e) generating the signal light beam from the light beam for the signal light beam by using a spatial light modulator;
(f) Fourier transforming the signal light beam with a lens when the signal light beam holds a two-dimensional digital data image; and
(g) recording a hologram by irradiating an optical recording medium with the reference light beam and the Fourier-transfonned signal light beam at the same time, wherein:
the hologram is recorded by using a Fourier transform component of the signal light beam in which a spread ζ from a zero-order light beam of the Fourier transform image of the signal light beam is defined by the following formula:

$$0 \leq \zeta \leq 4f\lambda/d$$

where f is a focal distance of the lens for irradiating the optical recording medium with the signal light beam, λ is a wavelength of the signal light beam, and d is a length of one side of one bit data of the signal light beam.

9. The hologram recording method according to claim 8, further comprising supplying a recording signal of each page with predetermined timing so that each page of the hologram is recorded from a recording start position at an interval of a predetermined amount of shift.

10. A hologram recording method comprising:
(a) separating a laser beam into a light beam for a reference light beam and a light beam for a signal light beam;
(b) setting a region corresponding to a Fourier transform component essentially required for data reproduction;
(c) designing a kinoform so that only the region is irradiated with the reference light beam having a random phase;
(d) generating the reference light beam from the light beam for the reference light beam by using a computer-generated hologram in which the kinoform is recorded;

(e) generating the signal light beam from the light beam for the signal light beam by using a spatial light modulator;

(f) Fourier transforming the signal light beam with a lens when the signal light beam holds a two-dimensional digital data image; and (g) recording a hologram by irradiating an optical recording medium with the reference light beam and the Fourier-transformed signal light beam at the same time, wherein the region setting process (b) includes setting a region A to a range of the following formula (6), $$0 < A < (4f\lambda/d)^2 \quad (6)$$

where f is the focal distance of the lens for irradiating the optical recording medium with the signal light beam, $\lambda$ is the wavelength of the signal light beam, and d is a length of one side of one bit data of the signal light beam.

11. The hologram recording method according to claim 10, further comprising supplying a recording signal of each page with predetermined timing so that each page of the hologram is recorded from a recording start position at an interval of a predetermined amount of shift.

12. A hologram recording apparatus comprising:
a light source for outputting a coherent light beam;
a spatial light modulator for modulating the light beam from the light source in accordance with data and generating a signal light beam; and
a holographic optical element for generating a reference light beam having a predetermined shape and intensity on an optical recording medium corresponding to an intensity distribution of the signal light beam on the optical recording medium, from the coherent light beam outputted from the light source, whereby a hologram is recorded by irradiating the optical recording medium with the signal light beam and the reference light beam, wherein:

the signal light beam holds a two-dimensional digital data image and has been Fourier transformed by a lens;

the intensity distribution of the reference light beam on the optical recording medium substantially coincides with the intensity distribution of the signal light beam; and the reference light beam has a wavefront which is generated by using a computer-generated hologram, the computer-generated hologram being a kinoform in which only a phase of an object light beam is recorded; and wherein:

the hologram is recorded by using only a Fourier transform component of the signal light beam in which a spread $\zeta$ from a zero-order light beam of the Fourier transform image of the signal light beam is defined, when the signal light beam holds a two-dimensional digital data image, by the following formula:

$$0 \leq \zeta \leq 4f\lambda/d$$

where f is a focal distance of the lens for irradiating the optical recording medium with the signal light beam, $\lambda$ is a wavelength of the signal light beam, and d is a length of one side of one bit data of the signal light beam.

13. The hologram recording apparatus according to claim 12, wherein a kinoform is recorded in the holographic optical element, and the kinoform is designed to record only a phase of an object light beam in the kinoform, for generating the reference light beam having a random phase.

* * * * *